US010701029B2

(12) United States Patent
Zhou et al.

(10) Patent No.: US 10,701,029 B2
(45) Date of Patent: Jun. 30, 2020

(54) PROCESSING PLATFORM AND METHOD TO PROCESS DOMAIN NAME TRANSACTIONS FOR A REMOTE DOMAIN NAME REGISTRY

(71) Applicants: Hui Zhou, Toronto (CA); Cedarampattu Mohan, Horsham, PA (US); Xuhui Wang, Toronto (CA); Steven Singer, Toronto (CA)

(72) Inventors: Hui Zhou, Toronto (CA); Cedarampattu Mohan, Horsham, PA (US); Xuhui Wang, Toronto (CA); Steven Singer, Toronto (CA)

(*) Notice: Subject to any disclaimer, the term of this patent is extended or adjusted under 35 U.S.C. 154(b) by 213 days.

(21) Appl. No.: 15/615,731

(22) Filed: Jun. 6, 2017

(65) Prior Publication Data

US 2018/0351910 A1  Dec. 6, 2018

(51) Int. Cl.
G06F 21/00     (2013.01)
H04L 29/12     (2006.01)
G06Q 30/00     (2012.01)
G06F 16/955    (2019.01)

(52) U.S. Cl.
CPC ......... *H04L 61/302* (2013.01); *G06F 16/955* (2019.01); *G06Q 30/018* (2013.01); *H04L 61/1511* (2013.01)

(58) Field of Classification Search
CPC ............. H04L 61/302; H04L 61/1511; H04L 61/3025; G06F 16/955; G06Q 30/018
See application file for complete search history.

(56) References Cited

U.S. PATENT DOCUMENTS

| 7,039,697 | B2 | 5/2006 | Bayles | |
|---|---|---|---|---|
| 2004/0167982 | A1 | 8/2004 | Cohen | |
| 2008/0034211 | A1* | 2/2008 | Shull | H04L 29/12066 713/175 |
| 2008/0071909 | A1* | 3/2008 | Young | G06Q 30/08 709/226 |
| 2016/0119283 | A1* | 4/2016 | Ptalis | H04L 61/302 709/223 |
| 2017/0070595 | A1* | 3/2017 | Gould | H04L 61/302 |
| 2017/0093793 | A1* | 3/2017 | Waldron | H04L 61/1511 |
| 2017/0104591 | A1* | 4/2017 | Merdinger | H04L 9/0819 |

(Continued)

FOREIGN PATENT DOCUMENTS

CN       108064444 A       5/2018

OTHER PUBLICATIONS

Patent Cooperation Treaty: International Search Report for PCT/CA2018/050677 dated Sep. 28, 2018; 4 pages.

(Continued)

*Primary Examiner* — Fatoumata Traore
*Assistant Examiner* — Michael M Lee
(74) *Attorney, Agent, or Firm* — Schwabe Williamson & Wyatt, PC (57) ABSTRACT

Within a particular Top Level Domain (TLD), domain name allocation and domain name ownership may be subject to certain restrictions requiring verification. A processing platform and method is disclosed to process verification of a domain name and/or a domain name entity such as a registrant for domain name transactions with a domain name registry. The processing platform and domain name registry may be remotely located relative to one another.

27 Claims, 5 Drawing Sheets

(56) References Cited

U.S. PATENT DOCUMENTS

2017/0195286 A1* 7/2017 Stahura ............... H04L 61/1511
2017/0317973 A1* 11/2017 Lam .................... H04L 61/1511
2018/0302366 A1* 10/2018 Kaliski, Jr. ......... H04L 61/1511

OTHER PUBLICATIONS

Patent Cooperation Treaty: Written Opinion of the International Searching Authority for PCT/CA2018/050677 dated Sep. 28, 2018; 8 pages.

* cited by examiner

PROCESSING PLATFORM AND METHOD TO PROCESS DOMAIN NAME TRANSACTIONS FOR A REMOTE DOMAIN NAME REGISTRY

FIELD

The present disclosure is related to the processing domain name transactions and more particularly to a processing platform and method to process domain name transactions for a remote domain name registry, to verify at least one of a domain name and domain name entity data for the transaction.

BACKGROUND

A domain name registry operator is an entity having contractual obligations with ICANN to operate a domain name registry for domain names registered in a top-level domain (TLD). A registry operator may utilize a registry service provider to actually perform the services. Registrants seek to register domain names via on-line transactions. Registrants typically engage with registrars, which are entities accredited to sell domain names by the domain name registry operator and/or service provider. Within a particular TLD, what may be registered for use as a domain name and who may register the domain name may be limited by various rules and/or policies. Registry operators may be subject to a nation state's policies or rules, for example.

As is widely understood, the Internet is a publicly available communication network which crosses political and other geographic borders. Domain name registry components may be physically located in one geographic region yet manage domain names subject to the policies or rules of an authority located in and/or having jurisdiction over a different geographic region.

SUMMARY

There is a need to provide a processing platform and method to process domain name transactions for a remote domain name registry. Within a particular TLD, domain name allocation and domain name ownership may be subject to certain restrictions requiring verification. A processing platform and method is disclosed to process verification of a domain name and/or domain name entity for domain name transactions with a domain name registry. The processing platform and domain name registry may be remotely located relative to one another.

There is provided in one aspect a system to process domain name transactions to manage domain name data and/or domain name entity data in a remote domain name registry and in a local data store. The system comprises: at least one transaction interchange component configured to receive and respond to requests for domain name transactions with the remotely located domain name registry, the at least one transaction interchange component configured to communicate the requests to the remotely located domain name registry and return respective request responses to respective components originating the requests; the local data store configured to locally store domain name records comprising the domain name data and/or domain name entity data; a verification component configured to locally process the domain name transactions by: verifying one or both of a domain name and domain name entity data for the domain name transactions; and locally storing domain name records to the local data store; and, in response to the verifying, communicating requests to lock or unlock domain name data and/or domain name entity data to the remote domain name registry via the at least one transaction interchange component; and a communication component coupling the at least one transaction interchange component, the verification component, and the remote domain name registry to facilitate communications to process the domain name transactions.

Each of the at least one transaction interchange component, the local data store, the verification component, and the communication component may be physically located in a local geographic region having a first respective system of law and venues therein; and the remote domain name registry may be located in a remote geographic region, distinct from the local geographic region and having a second respective system of law and venues therein, such that physical access to and jurisdiction over the local data store and associated components is available in the local geographic region, in accordance with the first respective system of law and venues therein. The verification component may be configured to communicate with a third party verification service to receive verification results to permit or deny use of a domain name associated with a respective domain name transaction.

The verification component may comprise a state manager component coupled to the local data store and a domain locking scheduler component coupled to the local data store; the state manager component may be configured to receive requests to process domain name transactions from the remote domain name registry and store at least respective initial domain name records in the local data store to initiate the local processing of the domain name data and/or the domain name entity data associated with the domain name transactions; and the domain locking scheduler component may be configured to monitor the local processing of at least some of the domain name transactions and lock out a use of a respective domain name associated with a respective one of the domain name transactions in response to the monitoring. The state manager component may be further configured to at least one of: add to or remove from the local data store domain name data for a domain name; add to the local data store a contact object to store domain name entity data, associating the contact object with at least one domain name; add to or remove from the local data store a lock for a domain name; and add a grace period within which to verify domain name entity data when the domain name transaction comprises one of: a request to change previously verified domain name entity data to domain name entity data that has not be verified; and a request to add or transfer a domain name for association with domain name data that has not be verified. The domain locking scheduler component may be configured to trigger a lock out of a respective domain name when domain name entity data has not been verified within the grace period.

The verification component may be configured to receive proof of identity information from or on behalf of an entity associated with a particular domain name and verify the domain name entity data for a respective one of the domain name transactions using the proof of identity information. The verification component may be further configured to communicate with a third party identity data verification service to receive verification of the proof of identity information, thereby to verify the domain name entity data. The entity may comprise one of an individual person and an organisation and the proof of identity information comprises, for the individual person, an image of the individual person's identity papers and for the organization, an image of the organisation's identity papers.

The communication component may comprise a message queue component to share messages among components coupled to the communication component.

A particular domain name transaction may comprises one of a transaction to register a new domain name and a transaction to change domain name entity data associated with at least one previously registered domain name.

The at least one transaction interchange component may be configured to communicate with the remotely located domain name registry using Extensible Provisioning Protocol (EPP) for the provisioning and management of a domain name system. The system may further comprise an EPP service endpoint to facilitate communications to the remotely located domain name registry from the communication component through the transaction interchange component.

The local data store may be further configured to locally store domain name records comprising at least one of: contact objects, each contact object comprising domain name entity data for an entity; associations between respective domain name data and contact objects; and locks to lock use of respective domain names represented by domain name data.

In one aspect there is provided a computer-implemented method to process domain name transactions to manage domain name data and/or domain name entity data in a remote domain name registry and in a local data store, the method executed by at least one processor and comprising: receiving and responding to a request for a domain name transaction between a request initiator and the remotely located domain name registry, communicating the request to the remotely located domain name registry and returning a response to the request initiator; locally processing the domain name transaction as triggered by the remote domain name registry system in response to the request, including verifying at least one of the domain name data and the domain name entity data associated with the domain name transaction; locally storing one or more domain name records comprising the domain name data and/or domain name entity data to the local data store; and communicating requests to lock or unlock domain name data and/or domain name entity data associated with the domain name transaction to the remote domain name registry in response to said processing.

The method may comprise communicating with a third party verification service to receive verification results to permit or deny use of a domain name associated with a respective domain name transaction. The method may comprise receiving requests to process domain name transactions from the remote domain name registry and storing at least respective initial domain name records in the local data store to initiate the local processing of the domain name data and/or the domain name entity data associated with the domain name transactions. The method may comprise monitoring the locally processing of at least some of the domain name transactions and lock out a use of a respective domain name associated with a respective one of the domain name transactions in response to the monitoring.

Locally storing may comprise at least one of: adding to or removing from the local data store domain name data for a domain name; adding to the local data store a contact object to store domain name entity data, associating the contact object with at least one domain name; adding to or removing from the local data store a lock for a domain name; and adding a grace period within which to verify domain name entity data when the domain name transaction comprises one of: a request to change previously verified domain name entity data to domain name entity data that has not be verified; and a request to add or transfer a domain name for association with domain name data that has not be verified. The method may comprise triggering a lock out of a respective domain name when domain name entity data has not been verified within the grace period.

The method may comprise receiving proof of identity information from or on behalf of an entity associated with a particular domain name and verifying the domain name entity data for a respective one of the domain name transactions using the proof of identity information. The method may comprise communicating with a third party identity data verification service to receive verification of the proof of identity information, thereby to verify the domain name entity data. The entity may comprise one of an individual person and an organisation and the proof of identity information comprises, for the individual person, an image of the individual person's identity papers and for the organization, an image of the organisations identity papers.

The local data store may be further configured to locally store domain name records comprising at least one of: contact objects, each contact object comprising domain name entity data for an entity; associations between respective domain name data and contact objects; and locks to lock use of respective domain names represented by domain name data.

The at least one processor and data store may be physically located in a local geographic region having a first respective system of law and legal venues therein and the remote domain name registry may be located in a remote geographic region, distinct from the local geographic region and having a second respective system of law and legal venues therein such that physical access to and jurisdiction over the at least one processor and data store and any data stored therein is available in the local geographic region, in accordance with the first respective system of law and legal venues therein regardless of whether or not jurisdiction over the remote domain name registry and any data stored therein is available in the local geographic region.

In one aspect there is provided a system to process domain name transactions to manage domain name data and/or domain name entity data in a remote domain name registry and in a local data store, the system comprising the local data store and a one or more computing devices having a processor, memory and communication capabilities, the system configured to: receive and respond to a request for a domain name transaction between a request initiator and the remotely located domain name registry, communicating the request to the remotely located domain name registry and returning a response to the request initiator; locally process the domain name transaction as triggered by the remote domain name registry system in response to the request, including verifying at least one of the domain name data and the domain name entity data associated with the domain name transaction; locally store one or more domain name records comprising the domain name data and/or domain name entity data to the local data store; and communicate requests to the remote domain name registry in response to said processing to lock or unlock domain name data and/or domain name entity data associated with the domain name transaction; wherein the system is physically located in a local geographic region having a first respective system of law and legal venues therein and the remote domain name registry is located in a remote geographic region, distinct from the local geographic region and having a second respective system of law and legal venues therein such that physical access to and jurisdiction over the system and any data stored therein is available in the local geographic region, in accordance with the first respective system of law and legal venues therein regardless of whether or not jurisdiction over the remote domain name registry and any data stored therein is available in the local geographic region.

In one aspect there is provided a domain name registry system to process domain name transactions to manage domain name data and/or domain name entity data, the system comprising a domain name data store and a one or more computing devices having a processor, memory and communication capabilities, the domain name registry system subject to verification of at least one of domain name data and domain name entity data by a remote domain name verification system having a local data store. The domain name registry system may be configured to: receive and respond to a request for a domain name transaction, the request received from and a response returned to a request initiator via the remote domain name verification system; process the domain name transaction, locally storing one or more domain name records comprising the domain name data and/or domain name entity data to the domain name data store; trigger a processing of the domain name transaction by the remote domain name verification system to initiate verification of at least one of the domain name data and the domain name entity data associated with the domain name transaction; and receive requests from the remote domain name verification system in response to said verification to lock or unlock domain name data and/or domain name entity data associated with the domain name transaction in the domain name data store.

The remote domain name verification system may be physically located in a remote geographic region having a first respective system of law and legal venues therein and the domain name registry system may be located in a local geographic region, distinct from the remote geographic region and having a second respective system of law and legal venues therein such that physical access to and jurisdiction over the remote domain name verification system and any data stored therein is available in the remote geographic region, in accordance with the first respective system of law and legal venues therein regardless of whether or not jurisdiction over the domain name registry system and any data stored therein is available in the local geographic region.

DETAILED DESCRIPTION

Domain names comprise text (e.g. strings) to identify Internet resources, such as networks, computers and services, etc. For humans, these text-based labels are often easier to memorize, ascribe meaning to and use than numerical addresses that are actually used within Internet protocols.

Domain names are formed by the rules and procedures of the Domain Name System (DNS). Domain names are organized in a hierarchy with levels (i.e. subdomains) from the DNS root domain. The first-level set of domain names are the top-level domains (TLDs) at the right most end of a domain name and just to the left of the "." root. In practice however, this rightmost "." is not usually expressed. TLDs include the generic top-level domains (gTLDs), such as the prominent domains info, edu, and gov, the country code top-level domains (ccTLDs) and others including mobi, organic, and global.

Second-level and third-level domain names are below the TLDs in the hierarchy. It is these levels, and particularly the second-level domain names, that are typically open for reservation by end users who wish to connect resources (e.g. local area networks, web sites, services, etc) to the Internet. End users may register a domain with a domain name registry typically through an on-line electronic transaction.

A domain name registry is a database of all domain names and the associated registrant information in the top-level domains of the DNS of the Internet. Such registries facilitate third party entities (e.g. a domain name owner or a party working on its behalf) to request administrative control of a domain name. A registry operator maintains all administrative data of the domain and generates a file which contains the addresses of the nameservers for each domain. Each registry operator is an organization that manages the registration of domain names within the domains for which it is responsible, controls (or at least implements the controls of) the policies of domain name allocation, and technically operates its domain. The allocated and assigned domain names are made available by registries through directory services (e.g via WHOIS or RDAP protocols) and via their domain name servers.

Registry operators sell domain names through separate entities (individual domain name registrars) to provide domain names to the public. When registering a domain name, the prospective domain name owner or a party working on its behalf provides identification and contact information to set up the administration of the domain name with the registry. A domain name owner is also called a registrant. Identification and contact information may include such information about the registrant entity (e.g. an individual person or a business, institution, organisation or other entity) as well as for administrative or technical identification and contact information.

As mentioned, the approval or verification of individual domain names and/or domain name registrants may be required. The processing of a domain name transaction to completion may be subject to such verification. Verification may be performed by a third party, such as a third party service provider or multiple such parties and providers.

Verification of a registrant entity may include verifying identification and/or contact information for the entity and/or individual persons associated with the entity.

Figure 1:
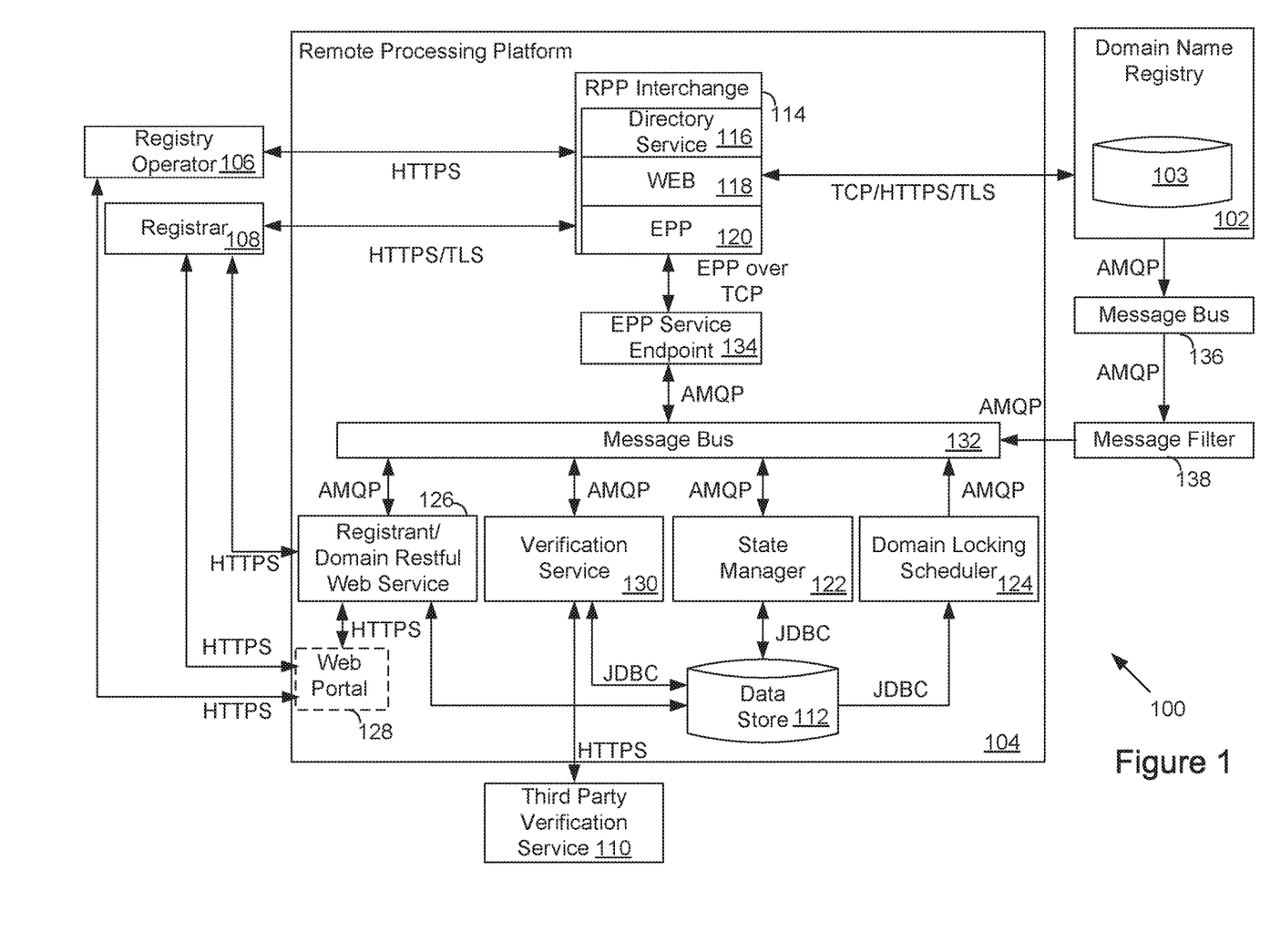
FIG. 1 illustrates components to remotely process domain name transactions for a domain name registry in accordance with an example.

FIG. 1 illustrates components 100 to remotely process domain name transactions for a domain name registry 102 in accordance with an example embodiment. A component herein typically comprises a computing device having at least one processor, a memory and communication capabilities and is typically configured via software executable by the at least one processor to perform certain functions and/or provide certain features. Though illustrated as separate components, it is understood that functions and/or features of two or more components may be combined and provided by a single computing device in some instances. Similarly, the functions or features of a single component may be divided and provided by more than one computing device. In other contexts herein, it will be apparent that a component may comprise or include other hardware components.

FIG. 1 shows domain name registry 102 in a simplified form with a database 103. Not shown are other computing and networking components of a registry as will be understood to those of ordinary skill in the art. Domain name registry 102 may be configured to manage a plurality of different domains, providing rights and privileges to various domain name registrars to sell domain names to others. At least some domains may be restricted by certain domain name and/or domain name entity policies requiring verification of domain name strings and/or registrant identification, etc. Processing of such verification may be delegated to a separate processing platform, which platform may be remotely located from domain name registry 102 as further described.

It is understood that in a context where two components are remote from one another, when viewed from one component, that one component may be a local component and the other component a remote component and vice versa.

In the present example, domain name registry 102 is coupled for communication with a remote processing platform (RPP) 104. From the point of view of RPP 104, domain name registry 102 is a remote domain name registry. RPP 104 is further coupled for communication with a registry operator component 106, a registrar component 108 and a third party verification service 110. While only one registry operator component 106, one registrar component 108 and one third party verification service component 110 are shown, it will be understood that RPP 104 may be coupled to more than one of each such component.

In the present example, domain name registry 102 and RPP 104 are remote from one another. They are remote not just in the sense that they are not configured within the same physical computer component (e.g. hosted in a same server or even in closely adjacent servers), but are separated geographically. Moreover, they may be separated in terms of political geography as well. In one scenario, they are separated sufficiently such that domain name registry 102 is located in one geographic region of the world (e.g. within Country A) and RPP 104 is located in another geographic region of the world (e.g. within Country B) as further described below. It is understood that in other examples, these elements of FIG. 1 need not be so remote from one another to operate.

RPP 104 comprises a plurality of components to process domain name transactions, which transactions may be initially requested by a registry operator or registrar via their respective components (106, 108). Such transactions may include requests to manage a domain name and/or domain name entity data associated with one or more domain names. Transactions may include requests to add, or delete a domain name and/or add, change or delete related domain name entity data. That is, a transaction may relate to one or both of a domain name and associated domain name entity data. Domain name and domain name entity data may be stored in domain name registry (e.g. database 103) and in a local data store (e.g. data store 112 of RPP 104).

RPP 104 may be configured to process aspects of a domain name transaction on behalf of domain name registry 102, for example, to facilitate verification of the domain name and/or the identification of the registrant entity or individuals associated with the registrant entity.

For example, RPP 104 may be configured to:
  receive and respond to a request for a domain name transaction between a request initiator and the remotely located domain name registry system, communicating the request to the remotely located domain name registry and returning a response to the request initiator;
  locally process the domain name transaction as triggered by the remote domain name registry system in response to the request, including facilitating verification of at least one of the domain name data and the domain name entity data associated with the domain name transaction;
  locally store one or more domain name records comprising the domain name data and/or domain name entity data to the local data store; and
  communicate requests to add or remove locks of domain name data and/or domain name entity data associated with the domain name transaction to the remote domain name registry in response to said processing.

Domain name allocation and verification of entities/individuals associated with the domain name may be subject to oversight from governments or other authorities having control over network resource usage within a specific geographic territory or territories, for example. In one example, a government, its delegate or another body in or on behalf of a sovereign state (e.g. Country B) may verify domain name strings in accordance with its policies, requiring access to domain name data presented in the context of a domain name transaction related to a TLD over which Country B is exercising control. In one example, a government, its delegate or another body in or on behalf of a sovereign state (e.g. Country B) may require specific validation of identities of those associated with a domain name of a domain name transaction, which may include the registrant and/or individuals associated with the registrant. Hence, processing a domain name transaction may require verification of at least one of domain name data and domain name entity data. Verification may relate to the suitability/validity of a domain name or the authenticity of domain name entity data.

Real name verification of registrant information may be undertaken to ensure the identity of the registrant, etc. is known and sufficiently recorded. Proof of identity information may be required to be supplied for verification by a third party. This may involve registrants providing appropriate copies of identity papers, corporate documents, permits, registrations and/or certificates etc. for individuals and/or legal entities such as corporations, companies, partnerships, joint ventures, institutions, unions, or other organizations, etc. Such may be provided via registrars to submit to a local processing platform (e.g. RPP 104) for verification to complete the processing of the domain name transaction.

As such, in some implementations, RPP 104 is physically located in a local geographic or political region (e.g. Country B) having a first respective system of law and legal venues therein. Domain name registry 102 may be located in a remote geographic region (e.g. Country A), distinct from the local geographic or political region and having a second respective system of law and legal venues therein. In such a scenario, physical access to and jurisdiction over RPP 104 and any data stored therein is available in the local geographic or political region (e.g. Country B), in accordance with the first respective system of law and legal venues therein regardless of whether or not jurisdiction over the remote domain name registry and any data stored therein is available within the local geographic region. Though referenced in terms sovereign states and particularly countries, other jurisdictions, unions or associations such as those comprising more than one country or territory may also apply.

RPP 104 may be configured to process domain name transactions in respect of one or more TLDs that are managed by domain name registry 102, and which require either or both of domain name and domain name entity data verification. Domain name registry 102 may manage additional TLDs which either do not require such validation or may have such validation performed by a separate RPP (not shown). RPP 104 may then process transactions for a subset of TLDs managed by domain name registry 102.

With reference to FIG. 1, RPP 104 comprises an RPP interchange 114 to communicate various requests between initiators (e.g. 106, 108) and domain name registry 102 as well as return responses thereto. RPP Interchange 114 may comprise various components for handling directory service communications, (e.g. directory service 116), Web communications, (e.g. Web 118) and domain name transaction communications such as via Extensible Provisioning Protocols (EPP) (e.g. EPP 120). Directory service 116 may be a WHOIS based or RDAP based service. While various protocols for directory or provisioning services and communications therefore (e.g. TCP, HTTPS, TLS) are referenced, other protocols may be used. The various protocols and API discussed herein are examples and are non-limiting.

EPP communications from EPP 120 to domain name registry 102 may be received via an EPP server (not shown) relatively proximate to the domain name registry 102. This EPP server may receive EPP commands from other sources (not shown), for example, in respect of other domains which are not required to be processed by RPP 104. The EPP server (and hence domain name registry 102) may distinguish EPP commands from EPP 120 using a port number through which the commands are received. The EPP server may initially process the requests to begin provisioning the domain name registry 102, for example, to add a domain name, add a domain name registrant (e.g. a contact), delete a domain name, or transfer a domain name from one domain name registrant to another within database 103 of domain name registry 102, among other transactions. Complete processing of such transactions may be subject to verification. As such domain name registry 102 may publish messages, through connector path 134, 136 to 132 to RPP 104 to trigger further processing (verification) of the transactions.

RPP 104 further comprises domain name and domain name entity verification components to process aspects of the domain name transactions on behalf of domain name registry 102. There is a state manager 122, a domain locking scheduler 124, a registrant/domain restful Web service 126, an optional Web portal 128 thereto and a verification service 130. Each of components 122, 124, 126 and 130 are coupled to a connector component 132 (e.g. a middleware component) providing a message bus (e.g. a message queue) for communications among these components. Connector component 132 is further coupled to an EPP service endpoint 134 which is coupled to EPP 120 of RPP interchange 114. Communications related to the transaction processing may be communicated to domain name registry 102, for example, to control access to/operability of a domain name in response to the verification processing. Domain name registry 102 is also coupled to connector component 132 via a second connector component 136 and message filter 138, for example to communicate messages to trigger processing of a domain name transaction.

In one example, the connector components 132 and 136 may be implemented using RabbitMQ (RabbitMQ is a trademark of Pivotol Software, Inc.), and communications may be via the AMQP protocol (the AMQP—Advanced Message Queuing Protocol standard is available from the AMQP working group (www.amqp.org)).

Each of state manager 122, domain locking scheduler 124, registrant/domain restful Web service 126 and verification service 130 are respectively coupled to data store 112. Each has reading and writing privileges except domain locking scheduler 124 which only utilizes read access. Data store 112 may be configured as a database to store information about domain name registrants and their domains, etc. Data may include the state of domains under management, the associated registrars and registrants, proof of identity documentation, domain name and/or identity verification state and history. Communications with data store 112 may be via Java Database Connectivity (JDBC) communications, for example.

Registrant/domain restful Web service 126 may be coupled to initiators (106 and 108) either directly (not shown), if such are configured to communicate with a Web service API provided by registrant/domain restful Web service 126, or via an optional Web portal 128 thereto (as shown).

State manager 122 receives communications from domain name registry 102, for example, to initiate domain name transaction processing. For example, a new transaction adding a domain name to domain name registry 102 may trigger a communication via connector component 136 and message filter 138 to connector 132 for delivery to state manager 122. Domain name registry 102 may publish EPP transaction messages via connector component 136 in response to requests received via EPP 120 to provide the triggers to state manager 122.

Message filter 138 (e.g. a Java application) may filter relevant messages and publish them to connector component 132. These messages trigger the domain name and domain name entity data verification components to process the transaction. For example, for a new domain name, state manager 122 stores the domain name data into data store 112 and initiates processing.

To enforce the verification of a domain name transaction, remote domain registry 102 may store a server lock against a particular domain name, e.g. with reason codes, to lock out access to the particular domain name, rendering it inoperable. For example, for a new domain name to become operable, at least one of the domain name itself and the associated registrant may require verification. On receiving a new domain name request, domain name registry 102 may provision the domain name, associating the domain to a registrant in its database. In one manner of operating it may store a server lock to the database, trigger verification processing by RPP 104 and await a message to unlock the domain name if the verification processing passes. However, in another manner of operating, domain name registry 102 may initially provision the domain name in an unlocked state to make the domain name operarable immediately, trigger verification processing by RPP 104 and await a message to lock the domain name if the verification processing fails. For example, if the domain registrant associated with the new domain name is new and hence unverified, data store 112 may be quickly reviewed by state manager 122 and a server lock message communicated via EPP service endpoint to domain name registry 102. State manager may also store a lock to the domain name data in data store 112. A code representing the unverified nature of the registrant may be provided (e.g. to remote domain registry 102 and data store 112).

State manager 122 may be configured as a stand alone Java application. State manager 122 may respond to messages sent through connector component 132 and communicate with data store 112 to: add or remove domain names; add domain name entity data (e.g. contact objects) when required; add or remove serverHold locks from domain names; and add a grace period for registrant verification if the verified registrant contact changed or the domain transferred from a verified registrant to an unverified registrant or a domain was added without a verified registrant. A grace period may be a period defined following an initiation of a domain name transaction to permit the registrant to provide the necessary facts and/or evidence (e.g. proof of identity information such as documents, etc.) to perform the verification. This may be a period of days, etc.

Domain locking scheduler 124 monitors progress of the processing (e.g. verification) and triggers a lock of a domain name, preventing use thereof, should the processing not complete appropriately within the grace period. Domain locking scheduler 124 may be defined as a stand alone Java application to read and review the domain name records for grace periods and determine whether such periods are expired. On an expiry, domain locking scheduler 124 may publish a message to state manager 122 to have it lock a domain name in data store 112 and communicate a message to domain name registry 102 to do the same, shutting down use of the domain name.

The information verification components (e.g. registrant/domain restful Web service 126 and verification service 130) are responsible for collecting proof of identity information and other inputs, (e.g. including documents from registrars 108, instructions from registry operator 106, etc) to verify that the registrant's name is their real name, etc, and facilitating verification by a third party. Registrant/domain restful Web service 126 may also be configured to permit a registry operator component access to domain name data and/or domain name entity data for at least one of informational purposes and to receive verification input, for example, as an override or supplement to verification input from third party verification service 110.

The information verification components learn about registry actions through messages sent by the domain name registry 102 via the connector component path (e.g. 136, 138, 132). Via state manager 122, the verification components may add serverHold locks (within data store 112 and domain name registry 102) to domain names that are registered to unverified registrants and may remove the serverHold lock from the domain names when the registrant's identity becomes verified. Depending on whether domain name registry 102 stores domain name data in a locked or unlocked state when initially processing a domain name transaction, the verification components and domain name locking scheduler 124 may be configured accordingly to add or remove locks in response to the verification results. State manager 122 may send a DomainUpdate message to add or remove the serverHold via connector component 132, EPP endpoint 134 and EPP 120 to domain name registry 102.

Registrant/domain restful Web service 126 is configured to receive proof of identity information (e.g. facts and evidence) from registrars (108), including, for example copies of identification papers for registrants, and others to verify domain name entity data. Web portal 128 may be configured as a PHP-based website that provides registrars an interface for uploading proof of identity information to registrant/domain restful Web service 126. Web portal 128 may communicate with registrant/domain restful Web service 126 component by sending JSON messages over HTTPS utilizing an API provided by service 126. Web portal 128 may also allow for registry operators (106) to approve (or reject) registrants or registrars based on the data provided. In other examples, registry operators may have components to communicate directly to the registrant/domain restful Web service 126 via the API rather than the Web portal. When a new registrant transaction or a change to registrant data transaction is received from domain name registry 102, state manager 122 may store such to data store 112 and publish a message for registrant/domain restful Web service 126. Such a message may also provide the associated registrar data for a transaction so that the Registrant/domain restful Web service 126 may notify the registrar component 108 that verification is outstanding (e.g. documents, etc. require up loading).

Registrant/domain restful Web service 126 may receive and store documents and other information (data) it receives in data store 112. When uploading is complete, Registrant/domain restful Web service 126 publishes a message via connector 132 to verification service 130 to verify the domain name entity data. Verification service 130 may retrieve domain name entity data, (e.g. identification and contact information, documents and other information, etc.,) to be verified and store verification results in data store 112. The retrieved data is provided to third party verification service 110 to receive verification services to authenticate the documents and identity information. Verification input/responses are received in return from third party verification service 110. This input comprises the verification results, which are stored to data store 112. Results may include reasons or a reason code when verification fails. Verification service 130 may publish a message to Registrant/domain restful Web service 126 with the results. In turn Registrant/domain restful Web service 126 publishes a message for state manager 122 and may make the results available to registrar 108 and/or registry operator 106. For example a verification pass message may initiate state manager 122 to release a server lock. Similarly, a verification pass message may initiate state manager 122 to clear any grace period or other data on which domain locking scheduler 124 relies to determine whether verification was performed within the grace period.

On a new domain name transaction, state manager 122 may publish a message that a domain name has been added to data store 112 so that verification service 130 may receive such a message and perform domain name verification with third party verification service 110. A verification result approving or disapproving the domain name is received and stored to data store 112. No reasons may be supplied when a domain name is not approved. A message with the verification result is published to state manager 122 (e.g. via registrant/domain restful Web service 126) to lock or unlock the domain name in data store 112 and domain name registry 102 as may be applicable.

FIGS. 2A-2D, 3 and 4A-4E are flow charts of operations to process domain name transactions by the various components of RPP 104 of FIG. 1.

Figure 2A:
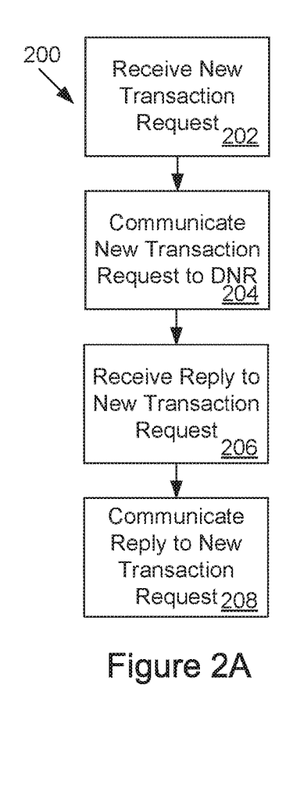
FIGS. 2A-2D, 3A-3C and 4A-4E are flow charts of operations to process domain name transactions by the various components of a remote processing platform of FIG. 1.

FIG. 2A is a flow chart showing operations 200 of RPP 104 to process a new domain transaction such as a request to register a new domain name in respect of a new domain name registrant. At 202 a request is received (e.g. at EPP 120) for the new domain name transaction. It may be received from an originator such as registrar component 108. At 204 the request is communicated to domain name registry 102 (e.g. to an EPP server thereof (not shown)). At 206 a response is received. At 208 the response is communicated to the originator (108). While a single request is described to register a new domain name with a new registrant, such as request may define and communicate more than one message in accordance with the EPP protocol.

Domain name registry 102 may process the request, taking into account for example that such request was received from EPP 120 (e.g. using port number or other source information). Domain name registry 102 may provision domain name data and domain name entity data in its data stores. Such records may be locked or otherwise made pending, for example, to prevent actual use as a domain name or prevent another registrant from registering the domain name, until RPP 104 has processed (verified positively or negatively) the domain name and/or domain name entity data. Domain name registry 102 may publish messages (via connector path 138, 138 to RPP connector component 132) back to RPP 104 to trigger such processing. It is understood that changes to domain name entity data for an existing domain name may not result in the locking of a domain name so as to maintain continuity of operations. A grace period may be established (e.g. within RPP 104) to conduct the verification processing, after which a domain name may be locked.

Domain name registry 102 may receive a variety of domain name transaction requests for processing. For example, a request to register a new (unverified) domain name for a new (unverified) registrant, a request to change (transfer) a current verified domain name from a verified registrant to either another verified registrant or an unverified registrant, a request to add an unverified registrant (e.g. in advance of transferring or adding a domain name), etc. Domain name registry may be configured to process such requests and set server locks in accordance with a configuration preference. In one example, it may be configured to not lock new domain names or domain name transfers to unverified registrants and await a message from RPP 104 to apply any necessary locks while verification remains pending. Domain name registry 102 may trigger processing of domain name transactions by RPP 104 even when a domain name or registrant associated with the transaction was previously verified. In such a case, RPP 104 may be configured to quickly verify such transactions and maintain data in local data store 112 to be current with data in database 103. For completeness domain name registry 102 may be configured so that it sends to RPP 104 a corresponding trigger for every transaction domain name registry 102 receives so that RPP 104 maintains like domain name and domain name entity and state related date in data store 112.

Figure 2B:
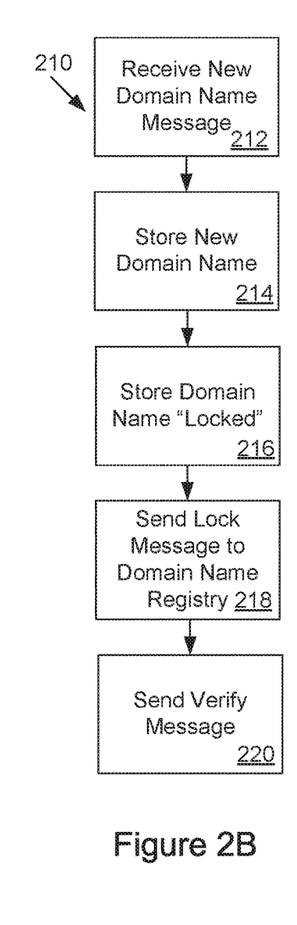

FIG. 2B shows operations 210 such as of state manager 122. At 212, state manager 122 receives a message to add a new domain name from connector component 132. At 214 state manager 122 stores the domain name data to data store 112. At 216 state manager 122 stores a domain name lock to data store 112 as this domain name is not verified. At 218 it sends a DomainUpdate message to domain name registry 102 to store a serverHold to lock the domain name and render it inoperable pending verification of the domain name. At 220 a message is sent to registrant/domain restful Web service to verify the domain name. If domain name registry 102 is configured to lock each new domain name, state manager 122 need not send the DomainUpdate message.

Figure 2C:
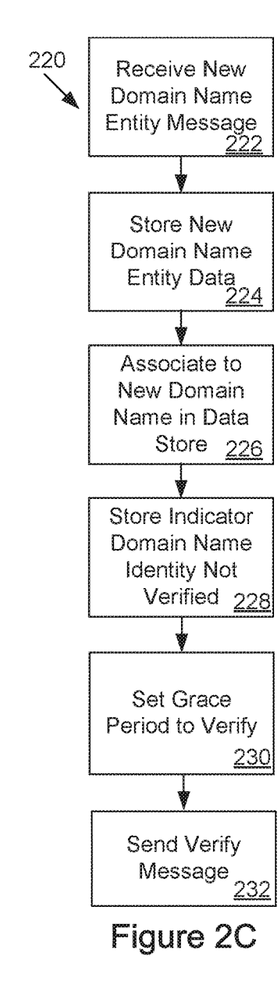

FIG. 2C shows operations 220 such as of state manager 122. At 222, state manager 122 receives a new domain name entity message from connector component 132. At 224 state manager 122 stores the domain name entity data (e.g. a contact object) to data store 112. At 226 state manager 122 stores an association between the new domain name entity data and the new domain name. At 228, state manager 122 stores an indicator (e.g. flag or other data) that the domain name entity data is not verified (e.g. that it is not authenticated domain name entity data). At 230 a grace period is stored to measure a time period to verify the domain name entity data. This grace period may be stored in association with one or more domain names associated with the unverified domain name entity data. At 234 a verify messages is sent to registrant/domain restful Web service to verify the domain name entity data. If the new domain name entity data is associated with a domain name that is unverified then operations of FIG. 2B will have locked the domain name. No further serverHold message needs to be sent to domain name registry 102 at this time. If the new domain name entity data is associated with a domain name that is currently associated with a verified registrant, then previous operations of RPP 104 will have unlocked the domain name. No further message to unlock or remove the serverHold needs to be sent to domain name registry 102 at this time while the verification is pending in the grace period.

The above example with reference to FIG. 2C relates to processing a new registrant in relation to a single domain name. It is understood that a registrant may be associated with more than one domain name. It is also understood that if subsequently, for example, two days later, another transaction is received in respect of the unverified domain name entity such as a transfer of an active domain name, a grace period for that verification may also be set in association with the domain name of the recent transaction, the grace periods for the earlier transactions being set to expire earlier.

Figure 2D:
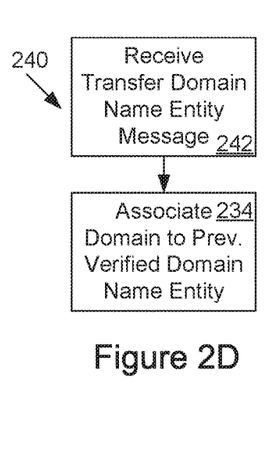

FIG. 2D shows operations 240 such as of state manager 122. At 242, state manager 122 receives a transfer domain name message to transfer a domain name to a previously verified domain name entity from connector component 132. At 234 state manager 122 associates the domain name to the previously verified domain name entity data (e.g. a contact object) in data store 112. No server lock or verification step is necessary. Though not shown, in operations 230 and 240, state manger 122 may look up in data store 112 whether verified records exist for the registrant or such presence or not may be indicated in the message received from the domain name registry.

Figure 3A:
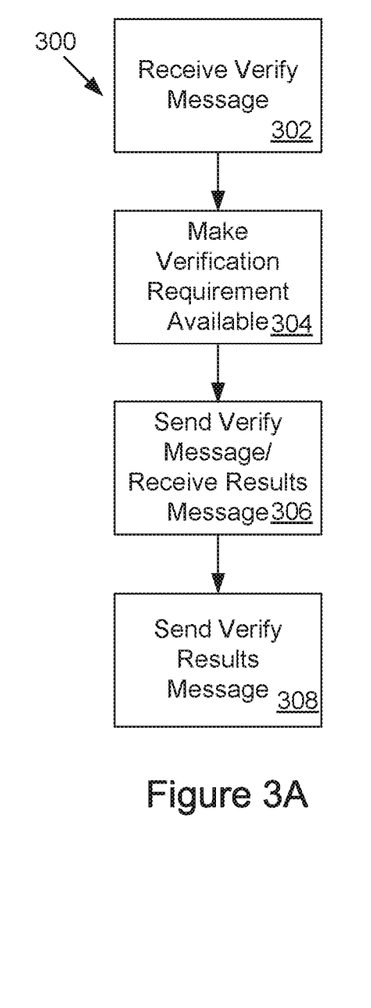

FIG. 3A shows operations 300 of registrant and domain name restful Web service 136 to process the verification of a domain name itself. At 302 a message to verify the domain name is received from state manager 122. At 304 the requirement to verify the domain name may be made available (e.g. via web portal 128 or otherwise). At 306 a message is published to verification service 130 to initiate verification and a result is received. At 308, a verification results message is sent to state manager 122.

Figure 3B:
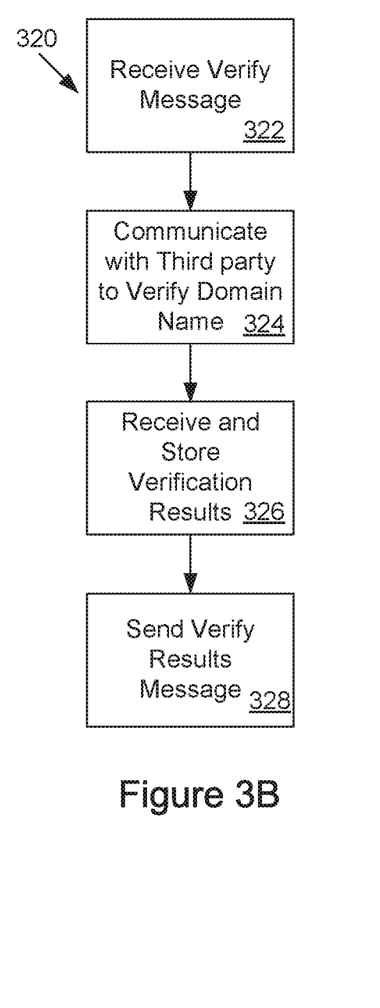

FIG. 3B shows operations 320 of verification service 130 to process the verification of a domain name itself. At 322 a message to verify the domain name is received from service 126. At 324 the requirement to verify the domain name is communicated to the third party verification service 110. At 326 verification results are received and stored. A message is published to registrant and domain name restful Web service 136 indicating the verification results are completed (at 328).

Figure 3C:
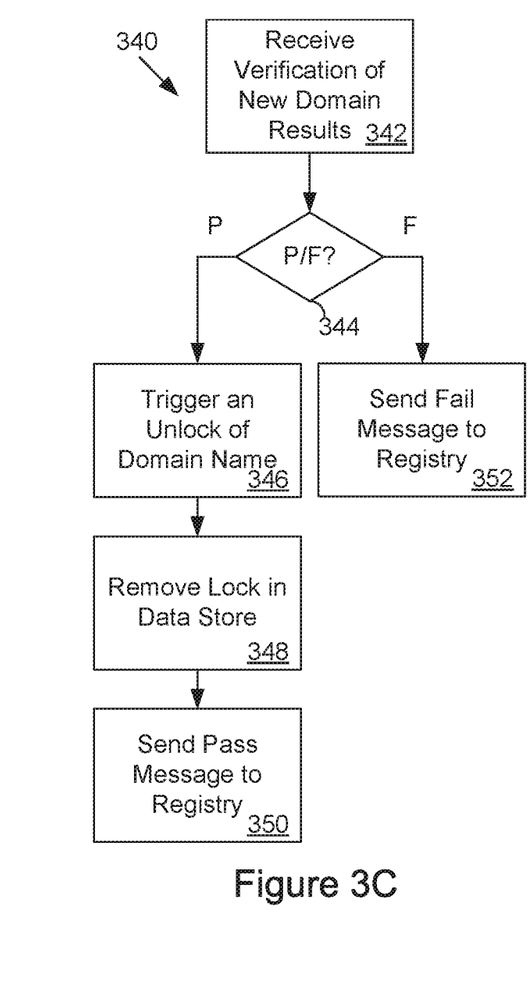

FIG. 3C shows operations 340 of state manager 122 to process a verification result for a domain name verification. At 342 a message is received for the verification results. A determination at 344 is made whether results are a pass or a fail. If a pass, via branch to 346, a message is sent to unlock the domain in domain name registry 102, removing the serverHold. The domain name is unlocked in data store 112 (at 348). At 350 an optional message is sent to domain name registry 102 that the domain name is accepted. If a fail, via branch to 352, an optional message is sent to domain name registry 102 that the domain name is rejected. As the domain name is already locked in data store 112 and domain name registry 102, no serverHold message is necessary.

Figure 4A:
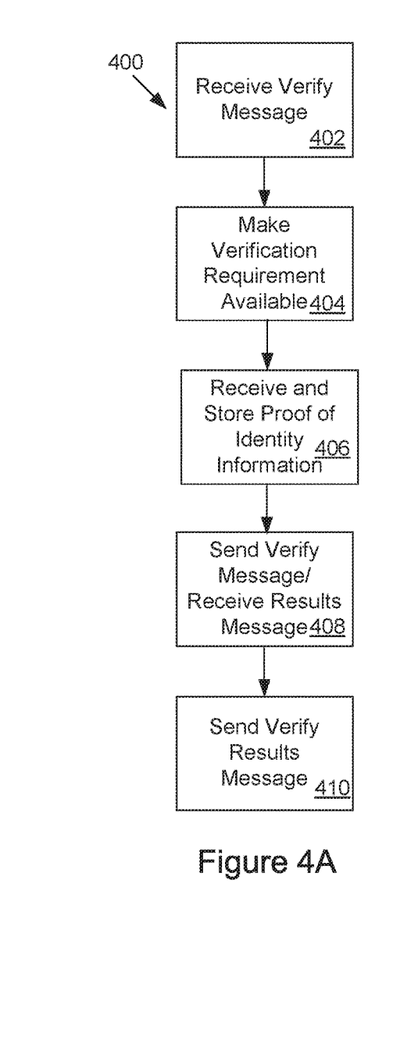

FIGS. 4A-4E illustrate operations to process verification of domain name entity data (e.g. real name verification) such as by various components of RPP 104. FIG. 4A shows operations 400 of restful web service 126 to obtain proof of identity data to verify, etc. At 402, a message to verify the domain name entity data is received. At 404 the requirement to verify is made available such as via web portal 128. Verification data comprising proof of identity information is received and stored at 406. Such information may include uploaded documents (e.g. via electronic copy, etc). Such documents and data may be received directly to registrant and domain restful Web service 126 or via Web portal 128 such as from registrar component 108. A registrar interface (not shown) may be provided via registrant and domain restful Web service 126. The interface may comprise a dashboard or other interface providing a list or other display of outstanding tasks related to registrar information to verify. Such an interface may enable a registry operator component to visualize and have access to domain name entity data requiring verification, receive input from a registry operator component to verify such data and take appropriate actions. The interface may be structured to provide process workflow, etc. In some examples, proof of identity information may be received from user components (not shown) operated by members of the public. At 408 a message is published to verification service 130 to initiate verification and a result is received. It is understood that the verification result message may take a period of days to be received by Registrant and domain restful Web service 126 from verification service 130. At 410, a verification results message is sent to state manager 122.

Verification results may be presented, including reasons why a result was negative via Web portal 128 or other API of registrant and domain restful Web service 126. It is understood that the Web Portal interface or Web Service API may enable a registrar to submit updated or corrected information to re-initiate verification processing. Registrant and domain restful Web service 126 may communicate another verification message to verification service 130 and further results may be received and further communicated to state manager 122 (all not shown).

In addition to providing an interface to a registrar to provide verification data, registrant and domain restful Web service 126 or via Web portal 128 thereto may provide an interface to a registry operator to assist with the process to verify proof of identity information. A registry operator may be provided access to data for one, more or all registrars. A registry operator may be provided authority to override verification results, etc., which override may invoke a sending of a verify results message to state manager 122 (sending not shown).

Figures 4B, 4C:
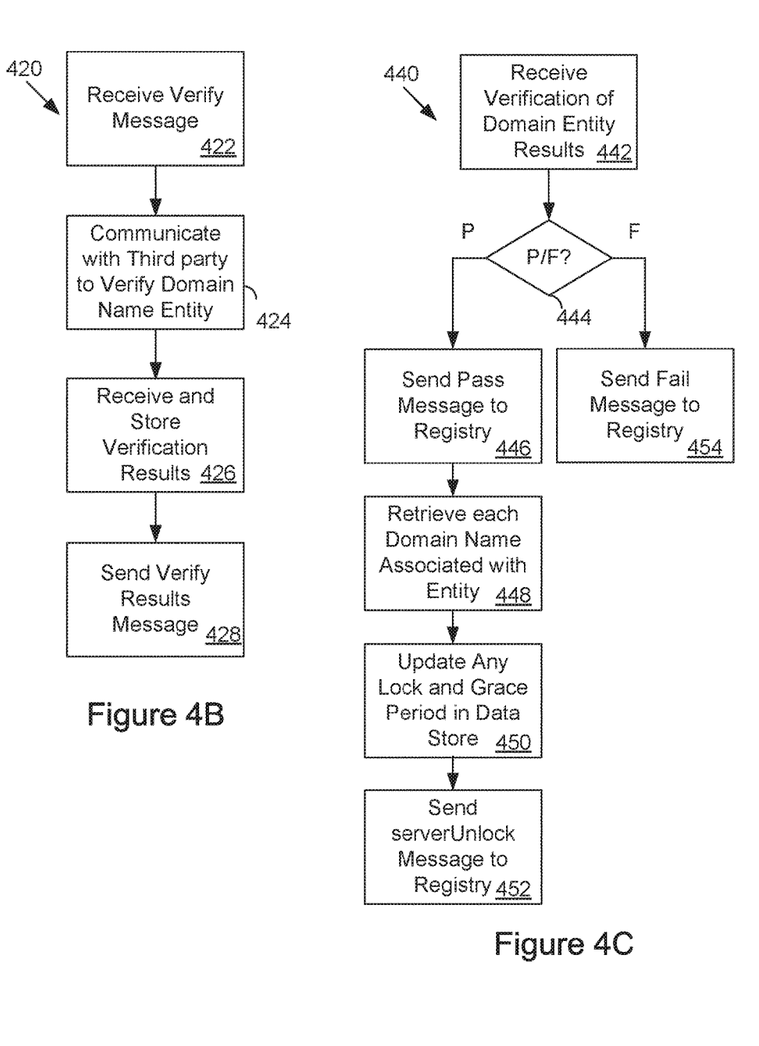

FIG. 4B illustrates operations 420 of verification service 130 to process the verification of the domain name entity data. At 422 a message to verify the domain name is received from registrant and domain restful Web service 126. At 424 the requirement to verify the domain name is communicated to the third party verification service 110. Not shown is the retrieval of verification data from data store 112, which data is provided with the communication to the third party verification service. At 426 verification results for the real name verification of the domain name entity (registrant) are received and stored in data store 112. The verification results may include a code or other indicator as to why verification failed (e.g. missing or incorrect data, etc.). A message is published to registrant and domain name restful Web service 136 indicating the verification results are completed (at 428). Rather than communicate with a third party verification service as shown, it is understood that a Web or other interface may be provided to present verification data and receive inputs verifying such data to generate and communicate verification results (where such Web or other interface is not shown).

FIG. 4C shows operations 440 of state manager 122 to process a verification result message from registrant and domain name restful Web service 136. At 442 the verification results message is received for the domain name entity data (registrant). A determination is made at 444 whether it was a pass or fail (which may entail a look-up in data store 112). If a pass, via branch to 446, a pass message is optionally sent to domain name registry 102. At 448, each domain name associated with the domain name entity is retrieved. At 450 any lock and grace period are updated (e.g. removed). At 452 a message is sent to registry 102 to remove the serverHold unlocking the domain name for use (e.g. for any locked domain name, provided the domain name is not also locked because the domain name itself is not yet verified).

If a fail is determined at 444, via branch to 454, a fail message is optionally sent to domain name registry 102 (which may have a code indicating why it failed). Operations may terminate. If the grace-period has time left then no (further) lock need be added, and the domain name entity may have until end of the grace period to resubmit for approval. If the grace period has already expired (or there wasn't one) then a lock is on the domain name and there is no need to re-add it (see FIG. 4D and description immediately herein below). Alternatively, though not shown, each domain name associated with the domain name entity may be retrieved. Data store 112 may be updated to lock any domain name that is not already locked and any grace period for a domain name may be updated (e.g. to remove it if only a single opportunity to present verification is allowed). A serverHold message may be sent to registry 102 (e.g. for any domain name to be locked).

Figures 4D, 4E:
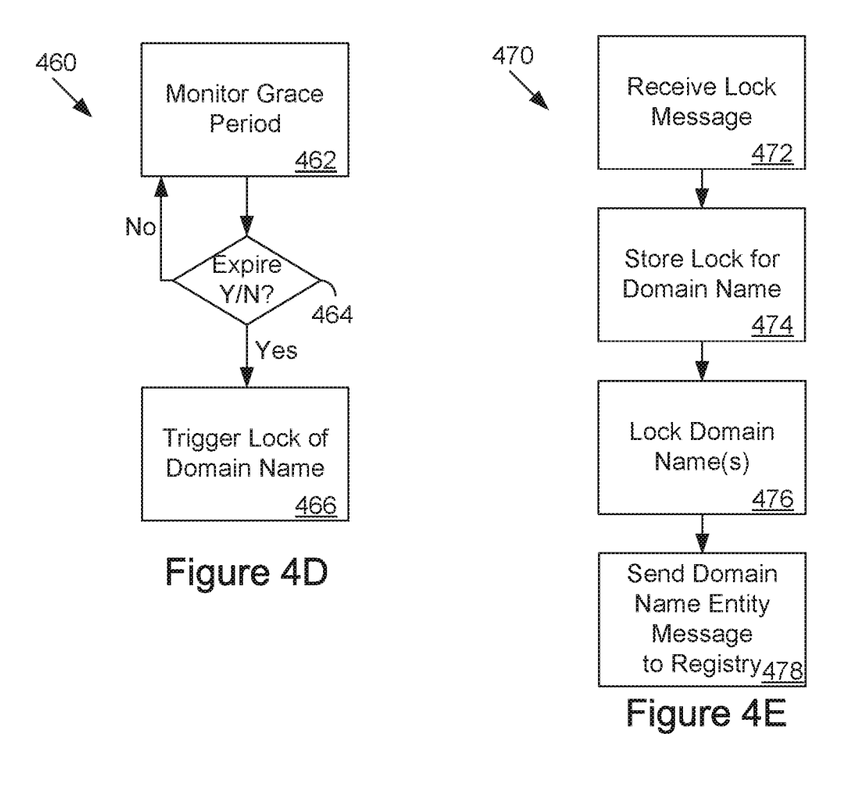

FIG. 4D illustrates representative operations 480 of domain locking scheduler 124 to trigger domain name locks if the processing of domain name entity data is not processed within a defined grace period. At 482, the grace period of a domain name is monitored (retrieved and compared to a current time and/or date for example). Such monitoring may be performed periodically (e.g. once per day). For example, the grace period may represent a number of days (or business days) following the receipt of a new domain name transaction within which the registrant and/or registrar has to furnish proof of identity information and complete verification. A grace period may be applied to a new registrant within a domain name transaction, particularly where the transaction relates to an existing domain name where existing domain name entity data has already been verified. In this way, the domain name may remain operational during the grace period (e.g. as the verification is processed). The grace period may comprise the specific date by which the processing must be complete. Monitoring may compare the current date to the grace period date where the data remains unverified. If the dates are the same, the grace period has expired. At 464, operations determine whether the period is expired or not. If not, operations may repeat (e.g. a day later) from 462. If the grace period has expired, then at 466, a message may be sent to state manager 122 to trigger the locking of the domain name. It is understood that the operations 460 are simplified and may be performed for each domain name record having a grace period in data store 112.

FIG. 4E illustrates representative operations 470 of state manager 122 to process a domain name lock in response to a message from domain locking scheduler 124. The message may indicate the domain name entity data which failed to be verified. At 472, a locking message is received via connector component 132. At 474, the domain name to lock is locked in data store 112. The grace period may be updated (e.g. removed). At 476 a serverHold message to lock the domain name is sent to remote domain name registry 102, if necessary. If the domain name is already locked because the domain name failed verification, another serverHold message need not be sent. An optional message may also be sent (478) indicating the domain name entity data that failed to be verified within the grace period.

Processing of verification of a domain name entity such as by components 126 and 130 may be responsive to the expiry of the grace period as well. For example registrant and domain restful Web service 126 may indicate to a registrar that the grace period has expired to explain why a formerly working domain name is no longer working. However, the components 126 and 130 may continue to process verification to allow a registrar to work to unlock the domain name.

Though not shown, it will be understood that other domain name transactions may also be implemented such as the deletion of a domain name such as by state manager 122 requesting a delete from data store 112. Transactions which change domain name entity data may comprise updates to a registrant's own data or transfer a domain from one registrant to another. Registrar transfers may also be contemplated.

Aspects of RPP 104 and its various components may be implemented as a machine, process or article of manufacture by using standard programming and/or engineering techniques to produce programming software, firmware, hardware or any combination thereof. Any resulting programs, having computer-readable program code, may be embodied within one or more computer usable media such as memory devices or transmitting devices, thereby making a computer program product or article of manufacture according to the description here. As such, the terms "software" and "application" as used herein are intended to encompass a computer program existent (permanently, temporarily, or transitorily) on any computer-usable medium such as on any memory device or in any transmitting device.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links. A machine embodying the teachings herein may involve one or more processing systems including, for example, CPU, memory/storage devices, communication links, communication/transmitting devices, servers, I/O devices, or any subcomponents or individual parts of one or more processing systems, including software, firmware, hardware, or any combination or sub-combination thereof.

What is claimed is:

1. A system to process domain name transactions to manage domain name data and/or domain name entity data in a remote domain name registry and in a local data store, the system comprising a local data store and one or more computing devices having a processor, memory and communication capabilities, the system configured to:
   operate at least one transaction interchange component configured to receive and respond to requests for domain name transactions with the remotely located domain name registry, the requests originating from respective external originating devices consisting of a registrar device or other device external to the system wherein the external originating devices only communicate the requests to the transaction interchange component and do not communicate the requests directly with the remote registry, the at least one transaction interchange component configured to communicate the requests to the remotely located domain name registry and return respective request responses to the respective external originating devices;
   the local data store configured to locally store domain name records comprising the domain name data and/or domain name entity data;
   operate a verification component configured to locally process the domain name transactions by: verifying one or both of a domain name and domain name entity data for the domain name transactions; and locally storing domain name records to the local data store; and, in response to the verifying, locking or unlocking domain name data and/or domain name entity data in the remote domain name registry utilizing requests to the remote domain name registry via the at least one transaction interchange component; and
   operate a communication component coupling the at least one transaction interchange component, the verification component, and the remote domain name registry to facilitate communications to process the domain name transactions.

2. The system of claim 1,
   wherein each of the at least one transaction interchange component, the local data store, the verification component, and the communication component are physically located in a local geographic region having a first respective system of law and venues therein; and
   wherein the remote domain name registry is located in a remote geographic region, distinct from the local geographic region and having a second respective system of law and venues therein;
   such that physical access to and jurisdiction over the local data store and associated components is available in the local geographic region, in accordance with the first respective system of law and venues therein.

3. The system of claim 2 wherein the verification component is configured to communicate with a third party verification service to receive verification results to permit or deny use of a domain name associated with a respective domain name transaction.

4. The system of claim 1 wherein:
   the verification component comprises a state manager component coupled to the local data store and a domain locking scheduler component coupled to the local data store;
   the state manager component is configured to receive requests to process domain name transactions from the remote domain name registry and store at least respective initial domain name records in the local data store to initiate the local processing of the domain name data and/or the domain name entity data associated with the domain name transactions; and
   the domain locking scheduler component is configured to monitor the local processing of at least some of the domain name transactions and lock out a use of a respective domain name associated with a respective one of the domain name transactions in response to the monitoring.

5. The system of claim 4 wherein the state manager component is further configured to at least one of:
- add to or remove from the local data store domain name data for a domain name;
- add to the local data store a contact object to store domain name entity data, associating the contact object with at least one domain name;
- add to or remove from the local data store a lock for a domain name; and
- add a grace period within which to verify domain name entity data when the domain name transaction comprises one of:
  - a request to change previously verified domain name entity data to domain name entity data that has not be verified; and
  - a request to add or transfer a domain name for association with domain name data that has not be verified.

6. The system of claim 5 wherein the domain locking scheduler component is configured to trigger a lock out of a respective domain name when domain name entity data has not been verified within the grace period.

7. The system of claim 1 configured to operate at least one verification component interface to enable the the verification component to receive proof of identity information from or on behalf of an entity associated with a particular domain name and verify the domain name entity data for a respective one of the domain name transactions using the proof of identity information, wherein the at least one verification component interface is different from a transaction interchange interface to the transaction interchange component for receiving and responding to the requests for domain name transactions.

8. The system of claim 7 wherein the entity comprises one of an individual person and an organisation and the proof of identity information comprises, for the individual person, an image of the individual person's identity papers and for the organization, an image of the organisation's identity papers.

9. The system of claim 1 wherein the verification component is further configured to communicate with a third party identity data verification service to receive verification of the domain name entity data.

10. The system of claim 1 wherein the communication component comprises a message queue component to share messages among components coupled to the communication component.

11. The system of claim 1 wherein a particular domain name transaction comprises one of a transaction to register a new domain name and a transaction to change domain name entity data associated with at least one previously registered domain name.

12. The system of claim 1 wherein the at least one transaction interchange component is configured to communicate with the remotely located domain name registry using Extensible Provisioning Protocol (EPP) for the provisioning and management of a domain name system.

13. The system of claim 12 further comprising an EPP service endpoint to facilitate communications to the remotely located domain name registry from the communication component through the transaction interchange component.

14. The system of claim 1 wherein the local data store is further configured to locally store domain name records comprising at least one of:
- contact objects, each contact object comprising domain name entity data for an entity;
- associations between respective domain name data and contact objects; and
- locks to lock use of respective domain names represented by domain name data.

15. The system of claim 1 wherein the at least one transaction interchange component receives the requests for domain name transactions from one or more registrar systems.

16. A computer-implemented method to process domain name transactions to manage domain name data and/or domain name entity data in a remote domain name registry and in a local data store, the method executed by at least one hardware processor of a system defining an intermediate platform and comprising:
- receiving and responding to a request for a domain name transaction between a request initiator and the remotely located domain name registry, communicating the request to the remotely located domain name registry and returning a response to the request initiator, the request initiator consisting of a registrar device or other device external to the intermediate platform wherein the request initiator only communicates the request to the intermediate platform and does not communicate the request directly with the remote registry;
- locally processing the domain name transaction as triggered by the remote domain name registry system in response to the request, including verifying at least one of the domain name data and the domain name entity data associated with the domain name transaction;
- locally storing one or more domain name records comprising the domain name data and/or domain name entity data to the local data store; and
- locking or unlocking domain name data and/or domain name entity data associated with the domain name transaction in the remote domain name registry utilizing requests to the remote domain name registry in response to said processing.

17. The method of claim 16 comprising communicating with a third party verification service to receive verification results to permit or deny use of a domain name associated with a respective domain name transaction.

18. The method of claim 16 comprising receiving requests to process domain name transactions from the remote domain name registry and storing at least respective initial domain name records in the local data store to initiate the local processing of the domain name data and/or the domain name entity data associated with the domain name transactions.

19. The method of claim 18 comprising monitoring the locally processing of at least some of the domain name transactions and lock out a use of a respective domain name associated with a respective one of the domain name transactions in response to the monitoring.

20. The method of claim 16 wherein locally storing comprises at least one of:
- adding to or removing from the local data store domain name data for a domain name;
- adding to the local data store a contact object to store domain name entity data, associating the contact object with at least one domain name;
- adding to or removing from the local data store a lock for a domain name; and
- adding a grace period within which to verify domain name entity data when the domain name transaction comprises one of:

a request to change previously verified domain name entity data to domain name entity data that has not be verified; and a request to add or transfer a domain name for association with domain name data that has not be verified.

21. The method of claim 20 comprising triggering a lock out of a respective domain name when domain name entity data has not been verified within the grace period.

22. The method of claim 16 comprising communicating with a third party identity data verification service to receive verification of the domain name entity data.

23. The method of claim 16 comprising providing at least one verification data interface to receive proof of identity information from or on behalf of an entity associated with a particular domain name and verifying the domain name entity data for a respective one of the domain name transactions using the proof of identity information, wherein the at least one verification data interface is different from an request interface provided to receive and respond to the request for the domain name transaction.

24. The method of claim 16 wherein the at least one processor and data store is physically located in a local geographic region having a first respective system of law and legal venues therein and the remote domain name registry is located in a remote geographic region, distinct from the local geographic region and having a second respective system of law and legal venues therein such that physical access to and jurisdiction over the at least one processor and data store and any data stored therein is available in the local geographic region, in accordance with the first respective system of law and legal venues therein regardless of whether or not jurisdiction over the remote domain name registry and any data stored therein is available in the local geographic region.

25. The method of claim 16 wherein the request for the domain name transaction is received from a registrar system.

26. A system to provide an intermediate platform to process domain name transactions to manage domain name data and/or domain name entity data in a remote domain name registry and in a local data store, the system comprising the local data store and a one or more computing devices having a processor, memory and communication capabilities, the system configured to:

receive and respond to a request for a domain name transaction between a request initiator and the remotely located domain name registry, communicating the request to the remotely located domain name registry and returning a response to the request initiator, the request initiator consisting of a registrar device or other device external to the intermediate platform wherein the request initiator only communicates the request to the intermediate platform and does not communicate the request directly with the remote registry;

locally process the domain name transaction as triggered by the remote domain name registry system in response to the request, including verifying at least one of the domain name data and the domain name entity data associated with the domain name transaction;

locally store one or more domain name records comprising the domain name data and/or domain name entity data to the local data store; and in response to said processing, lock or unlock domain name data and/or domain name entity data associated with the domain name transaction in the remote domain name registry by communicating requests to the remote domain name registry;

wherein the system is physically located in a local geographic region having a first respective system of law and legal venues therein and the remote domain name registry is located in a remote geographic region, distinct from the local geographic region and having a second respective system of law and legal venues therein such that physical access to and jurisdiction over the system and any data stored therein is available in the local geographic region, in accordance with the first respective system of law and legal venues therein regardless of whether or not jurisdiction over the remote domain name registry and any data stored therein is available in the local geographic region.

27. A domain name registry system to process domain name transactions to manage domain name data and/or domain name entity data, the system comprising a domain name data store and a one or more computing devices having a processor, memory and communication capabilities, the domain name registry system subject to verification of at least one of domain name data and domain name entity data by a remote domain name verification system having a local data store, the domain name registry system configured to:

receive and respond to a request for a domain name transaction, the request received from and a response returned to a request initiator via the remote domain name verification system, the request initiator consisting of a registrar device or other device external to the the domain name registry system and the remote domain name verification system wherein the request initiator only communicates the request to the remote domain name verification system and does not communicate request directly with the domain name registry system;

process the domain name transaction, locally storing one or more domain name records comprising the domain name data and/or domain name entity data to the domain name data store;

trigger a processing of the domain name transaction by the remote domain name verification system to initiate verification of at least one of the domain name data and the domain name entity data associated with the domain name transaction; and lock or unlock domain name data and/or domain name entity data associated with the domain name transaction in the domain name data store in response to requests received from the remote domain name verification system in response to said verification;

wherein the domain name verification system is physically located in a local geographic region having a first respective system of law and legal venues therein and the remote domain name registry is located in a remote geographic region, distinct from the local geographic region and having a second respective system of law and legal venues therein such that physical access to and jurisdiction over the domain name verification system and any data stored therein is available in the local geographic region, in accordance with the first respective system of law and legal venues therein regardless of whether or not jurisdiction over the remote domain name registry and any data stored therein is available in the local geographic region.

* * * * *